United States Patent Office 2,730,155
Patented Jan. 10, 1956

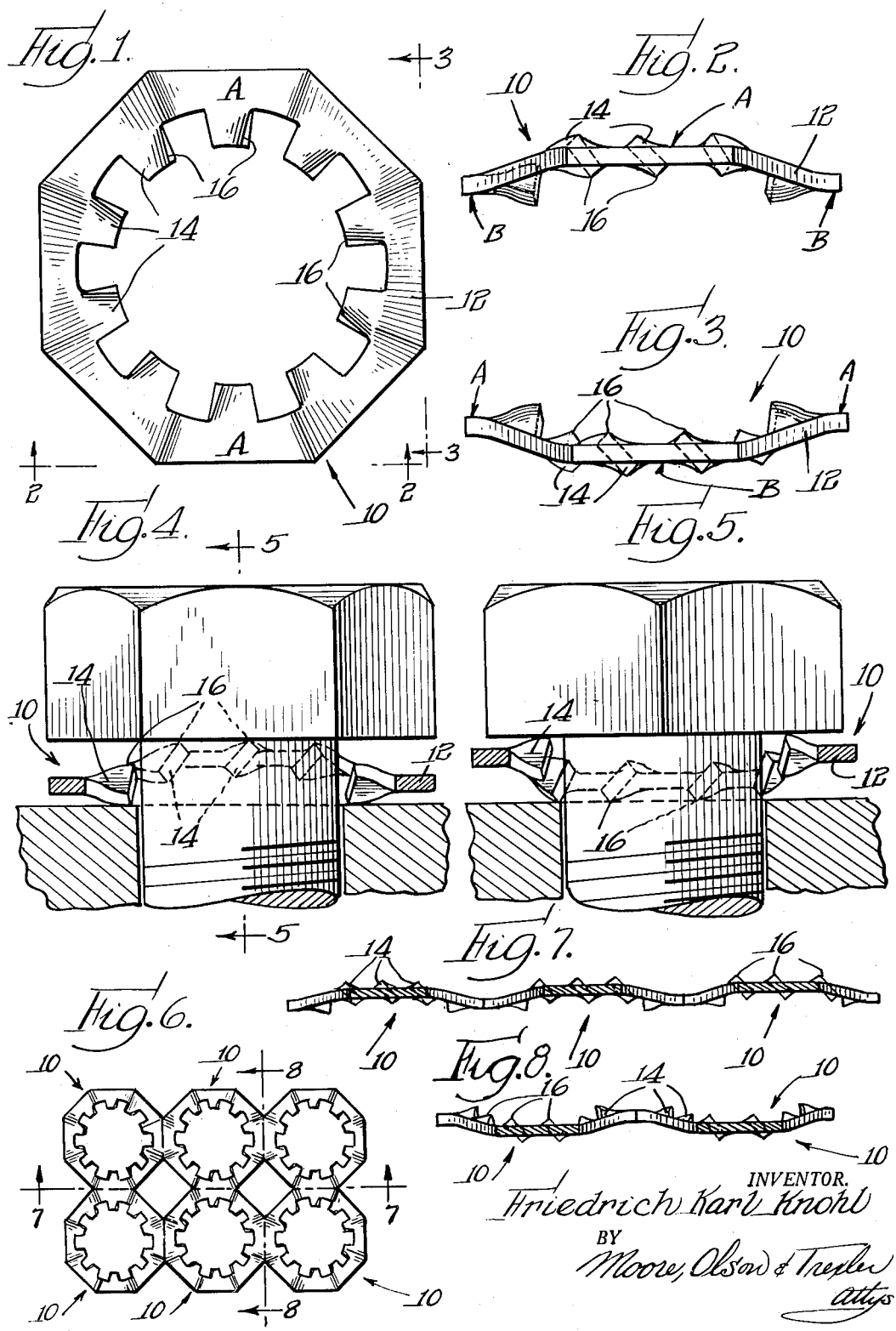

2,730,155
POLYGONAL LOCK WASHER HAVING UNDULATING CONFIGURATION

Friedrich Karl Knohl, Chicago, Ill., assignor to Illinois Tool Works, Chicago, Ill., a corporation of Illinois Application December 27, 1951, Serial No. 263,659

3 Claims. (Cl. 151—35)

This invention relates generally to lock washers, and more particularly to lock washers which are adapted for use in instances where maximum axial flexing of the washer stock is desired.

Lock washers, commonly referred to in the trade as toothed lock washers to distinguish them from conventional split ring type washers, depend for their locking efficiency upon the biting action of the teeth and the inherent resiliency of the prongs which present these teeth. In the conventional type toothed lock washer, a flat annular body supports a plurality of circumferentially spaced prongs along either the internal or external margin, and these prongs are warped or flexed so as to present locking teeth projecting beyond the bounding planes of the body. The tendency for the washer to deflect axially is limited to the tendency of the prongs to untwist or flatten when subjected to clamping pressure. There are numerous applications in which this limited amount of axial washer deflection is sufficient to provide the required locking efficiency. There are other applications, however, where a greater degree of axial deflection of the washer makes for increased efficiency in locking effectiveness. The present invention contemplates a lock washer of the toothed type which will provide a substantial increase in axial deflection of the washer, and at the same time permit the teeth of the washer prongs lockingly to impinge or embed themselves within the surfaces between which the washer is clamped.

It is a further object of the present invention to provide a toothed lock washer as set forth above, capable of maximum axial deflection which is symmetrical on both sides so that either of said sides may be applied toward or away from the work surface. In other words, the invention contemplates washers, the sides of which may be indiscriminately applied to the clamping surface of a screw head or nut.

More specifically, it is an object of the present invention to provide a toothed lock washer as set forth above, wherein maximum axial deflection of the washer body is attained during the clamping of the washer, and to this end the invention contemplates a lock washer wherein the body presents a pair of diametrically disposed high points on one side of the washer and a pair of diametricaly disposed high points disposed in quadrature relation thereto on the opposite side of the washer.

It is a further object of the present invention to provide a lock washer as set forth above which is so shaped as to facilitate materially the ease with which these washers may be formed and stamped from sheet metal stock.

The foregoing and other objects and advantages will be more apparent from the following detailed description, when considered in connection with the accompanying drawing, wherein:

Fig. 1 is a plan view of a lock washer which is representative of one embodiment of the invention;

Fig. 2 is a side elevational view of the lock washer of Fig. 1, said view being taken substantially along the line 2—2 of Fig. 1;

Fig. 3 is also a side elevational view of the lock washer taken substantially along the line 3—3 of Fig. 1;

Fig. 4 discloses the lock washer in position to be clamped between the clamping surface of a screw head and a complementary work surface;

Fig. 5 is a view similar to Fig. 4, said view being taken substantially along the line 5—5 of Fig. 4;

Fig. 6 is a plan view of a strip of lock washers contemplated by the present invention prior to individual severance from the strip;

Fig. 7 is an enlarged sectional view taken substantially along the line 7—7 of Fig. 6; and Fig. 8 is an enlarged transverse sectional view taken substantially along the line 8—8 of Fig. 6.

Referring now to the drawing more in detail, wherein like numerals have been employed to designate similar parts throughout the various figures, it will be seen that one embodiment of the invention constitutes a lock washer designated generally by the numeral 10. The disclosed embodiment of the lock washer 10 incorporates an outer annular body portion 12 which, as viewed in plan, is octagonal in shape. The inner margin of the body 12 carries a plurality of prongs 14 extending radially inwardly and circumferentially spaced along said margin. Each prong is deflected or twisted so as to present a pair of oppositely disposed locking teeth 16.

Particular attention is directed to the manner in which the washer body is bowed. As will be seen from Figs. 2 and 3, the washer is bowed so as to present diametrically disposed high body portions A on the top of the washer. Because the washer is arched from one periphery to the other, as shown in Fig. 3, these diametrically disposed high points of the body A are presented. Likewise, because the washer is also arched in quadrature relation to the first mentioned arch, a pair of diametrically disposed high points B are presented. Thus the high points A are disposed at substantially 90° with respect to the high points B. Arching the washer from one periphery to the other affords maximum axial deflection, so that when the washer is tightened in position from the position shown in Figs. 4 and 5 to a finally clamped position, the applied force must overcome the resiliency of the washer arches. In other words, the double arch construction affords considerable axial washer deflection in addition to the firm resiliency of the locking prongs. In this manner the resiliency of the entire washer body is brought into play and exerts a firm locking force between the underside of the screw head and the complementary surface of the work over a considerable axial extent of relative movement of these clamping surfaces. This is to be distinguished, for example, from the relatively small degree of flexing experienced by the locking prongs 14 as they are clamped between said surfaces.

The double arched washer construction just described not only provides a washer with greater axial flexibility when in use, but also presents a symmetrical washer. That is to say, either side of the washer may be applied to either the work surface or the clamping surface of the screw head. This is to be distinguished from washers of the type which can only be applied with one of the washer sides in predetermined relation to the clamping surfaces. It will also be apparent that by employing the above described double arched washer design, the washer body may be tightened from the position of maximum arch to a substantially flattened position without subjecting the washer stock to stresses which exceed the elastic limit thereof. Therefore, a washer construction in accordance with the teachings of the present invention may be used over and over again without subjecting the stock to any degree of permanent distortion.

It will also be apparent that the invention is not limited to the use of any particular toothed design along the inner margin of the body, but it has been found very practical to use the radial prong arrangement shown and described herein. The radial twisted or deflected prong arrangement provides relatively rigid locking resiliency as distinguished from the much less rigid resiliency of the double arched body. This combination of relatively firm yieldability and relatively free yieldability resulting from the double arch arrangement, produces marked increase in locking efficiency.

Obviously, the invention is not limited to the specific structures disclosed herein, but is capable of other modifications and changes without departing from the spirit and scope of the appended claims.

The invention is hereby claimed as follows:

1. A sheet metal lock washer comprising a polygonal washer body of general annular form, and a plurality of internally extending locking teeth projecting axially beyond the opposite surfaces of the washer body adjacent thereto, said washer body being bowed in opposite axial directions and at 90 degrees relative displacement to provide a first pair of diametrically opposed substantially flat peripheral edge sections disposed in one plane and a second pair of diametrically opposed substantially flat peripheral edge sections in a plane spaced axially from the plane of said first pair of edge sections and at 90 degrees relative displacement thereto, adjacent edges of the said peripheral edge sections being joined by intermediate sections completing the polygonal washer body, and said substantially flat peripheral edge sections having plural locking teeth projecting therefrom and presenting spaced contact surfaces therealong to provide stable support of the washer and to facilitate application of either side of the washer to a work surface or to a cooperating fastener element.

2. A sheet metal lock washer as claimed in claim 1, wherein the intermediate sections of the polygonal washer body joining the adjacent edge sections are substantially inclined to substantially space the first and second pair of edge sections axially from one another whereby initial locking between a fastener element and a work surface results primarily from the inherent resiliency of the washer body under compression and with the locking teeth accomplishing their locking function after predetermined compression of the washer body.

3. A connected strip of lock washers each having the structural characteristics as set forth in claim 1, wherein the outer margin of one washer is integrally joined with the adjacent margin of a companion washer.

References Cited in the file of this patent

UNITED STATES PATENTS

| | | |
|---|---|---|
| 635,767 | Gleason | Oct. 31, 1899 |
| 1,016,798 | Thomson | Feb. 6, 1912 |
| 1,850,242 | Olson | Mar. 22, 1932 |
| 1,878,425 | Olson | Sept. 20, 1932 |
| 1,903,785 | Lillig | Apr. 18, 1933 |
| 2,352,118 | Poupitch | June 20, 1944 |

FOREIGN PATENTS

| | | |
|---|---|---|
| 552,580 | France | Jan. 24, 1923 |
| 204,565 | Switzerland | Oct. 16, 1939 |